Dec. 24, 1957    W. T. VON DER NUELL    2,817,544
SEAL FOR ROTATING STRUCTURES
Filed Dec. 13, 1954
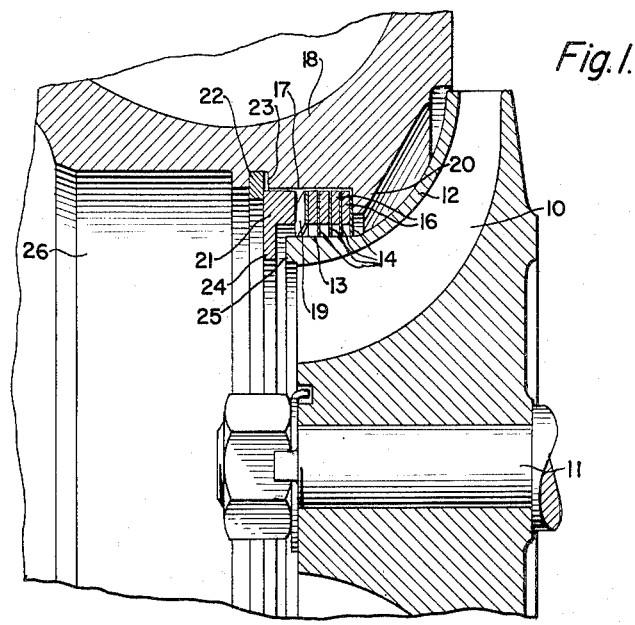
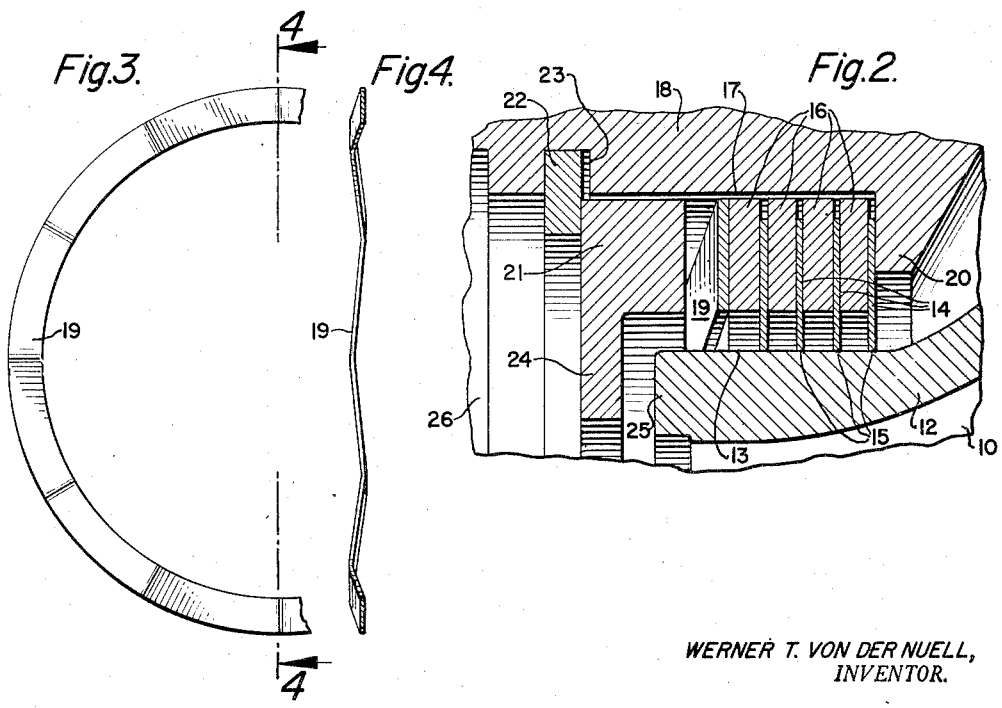
WERNER T. VON DER NUELL,
INVENTOR.
BY John H. T. Wallace United States Patent Office 2,817,544
Patented Dec. 24, 1957

2,817,544

SEAL FOR ROTATING STRUCTURES

Werner T. Von der Nuell, Santa Monica, Calif., assignor to The Garrett Corporation, Los Angeles, Calif., a corporation of California Application December 13, 1954, Serial No. 474,945

2 Claims. (Cl. 286—7)

This invention relates to a seal for rotating structures and has particular application to compressor impellers which operate at high speed and require seals of considerable diameter, in surrounding relationship to the inlet thereof.

Conventional seals for rotating structures generally include an element, carried by the rotating structure, which contacts a seal structure which is stationarily supported by a shaft housing or bearing carrier structure. Such seals, when provided with a resilient means for maintaining the seal elements in contact with each other, are subject to considerable overrunning or rubbing friction of the seal elements. When ordinary seals are employed in connection with large diameter high speed rotating structures, overrunning friction may be prohibitive. It is recognized that seals of large diameter must maintain very close tolerances in order to prevent excessive fluid leakage through the seal. This is particularly true when a seal is employed around the inlet of a compressor impeller where the pressure differential across the seal is quite substantial.

Although the prior art includes various seals for rotating structures, such prior art devices have not been entirely successful in maintaining an efficient seal around the inlet of a compressor impeller, while at the same time providing for a minimum of overrrunning friction. In addition to the foregoing problems encountered in seals of the class discussed, it has been recognized that the axis of a compressor impeller, or other rotating structure, may be somewhat eccentric to the housing surrounding the same, whereby seal installation and operating problems are made increasingly difficult. In the production of centrifugal compressors, for example, it has been found that the accumulation of tolerances occasioned by the assembly of such machines poses a difficulty in the maintenance of the impeller axis concentric to the bore in the impeller housing which is arranged to support a seal surrounding the inlet of the impeller.

It is an object of the present invention to provide a seal for rotating structures which will accommodate an eccentric relationship of the rotating structure relative to a stationary seal support, and which is also capable of operating efficiently on large diameter structures without creating undue overrunning friction within the sealing elements.

Another object of the invention is to provide a seal for rotating structures which is particularly adapted for use in providing a seal surrounding the inlet of a high speed compressor impeller.

A further object of the invention is to provide a novel arrangement of alternate seal washers and spacers which are resiliently loaded as a unit in order to precisely maintain the seal washers adjacent to a rotating structure which is eccentric to the seal support, and also to maintain all elements of the seal in closely fitted stationary relationship to each other and to the seal support, whereby there is no overrunning friction between the seal washers and the spacers therebetween.

Further objects and advantages of the invention will be recognized with reference to the following specification, appended claims and accompanying drawing in which Fig. 1 is a fragmentary view in axial section of a compressor showing a seal structure installed therein and in accordance with the present invention; Fig. 2 is an enlarged fragmentary sectional view of the seal structure, as shown in Fig. 1; Fig. 3 is a fragmentary side elevational view of a seal loading spring forming a part of the present invention; and Fig. 4 is a sectional view of the seal loading spring, taken along the line 4—4 of Fig. 3.

According to the present invention, a seal is provided for the purpose of operating around structures which rotate at high speed and may be quite large in diameter. In addition, the seal is capable of operating efficiently and with normal freedom when installed in connection with a housing having a seal support which may be eccentric to the axis of the rotating structure. At the same time, this seal is not required to operate under any continuously rubbing condition of the parts and, therefore, no overrunning friction is attendant to the normal high speed operation of a rotating structure around which the seal may be located.

As shown in Fig. 1 of the drawing, a compressor impeller and housing are disclosed for the purpose of illustrating an advantageous installation of the seal in accordance with the present invention. A compressor impeller 10 is mounted on a rotating shaft 11, and the impeller is provided with an integral shroud 12 having an external sealing surface 13 which is surrounded by the seal structure. The seal structure includes a plurality of thin, spaced washers 14, which are ring shaped and have openings 15 closely approximating the diameter of the sealing surface 13. Due to the thinness of the seal washers 14, they create a minimum of rubbing friction on the sealing surface 13 of the impeller, as will be hereinafter described in detail. The openings 15 have slight running clearances relative to the sealing surface 13 and are maintained in spaced relationship to each other by means of spacers 16, which are supported in a bore 17 of a housing 18. It will be noted that the bore 17, due to an accumulation of manufacturing tolerances attendant to the assembly of the compressor, may be eccentric to the axis of the seal surface 13 of the impeller 10. It will be seen that the spacers 16 at their peripheries are quite closely fitted to the bore 17, while the peripheries of the seal washers 14 are considerably spaced from the bore 17, providing liberal clearance thereof and permitting eccentricity of the seal washers 14 relative to the spacers 16 and bore 17. A plate spring 19 is arranged to provide axial loading of the seal washers 15 and spacers 16 in order to maintain them closely engaged with each other and stationary relative to the housing 18. The housing 18 is provided with a shoulder 20 adapted to provide an abutment for the seal washers and spacers in order to support them in opposition to the resilient force of the spring 19. The spring 19 is maintained in compression by a guard ring 21 axially fixed in the housing 18 by a snap ring 22 engaged in a groove 23 having a greater diameter than the bore 17. The guard ring 21 is provided with an inwardly directed flange 24 which extends inwardly of the seal surface 13 and shroud 12 at the inlet of the impeller. The flange 24 is thus arranged to protect the end 25 of the impeller shroud 12 when a duct or conduit is inserted into a bore 26 of the housing 18.

The operation of the seal, in accordance with the present invention, is substantially as follows.

When the compressor, as shown in Fig. 1 of the drawing, is assembled and the impeller 10 thereof is rotatably mounted in the housing 18, the seal may be readily installed even though the axis of the impeller shaft 11 and seal surface 13 is eccentric to the seal supporting bore 17. This seal installation under eccentric conditions is readily accomplished due to the fact that the seal washers 14 have considerable outer peripheral clearance relative to the bore 17, while the spacers 16 are relatively more closely fitting in their peripheral clearance of the bore 17. It will be recognized that in installation, the seal washers 14, due to their closely fitted relationship to the seal surface 13 of the impeller shroud 12, will be substantially concentric to the axis of the impeller. The spring 19 maintains a compressive force on the seal washers to hold them tightly engaged with the spacers, whereby an efficient stationary seal structure is maintained. Due to the thin structure of the seal washers 14, they may be very closely fitted to the seal surface 13 of the impeller shroud 12 without creating undue rubbing friction. During initial operation of the impeller 12, slight centrifugal and thermal diametric expansion of the shroud 12 may occur. By reason of such expansion, the openings 15 in the seal washers 14 will become very precisely aligned in concentric relation with the axis of the impeller 10 and the seal surface 13. This alignment is permitted by the slight shifting of the seal washers 14 between the spacers 16 as may be necessary. Continued operation of the impeller 10 may then proceed with proper freedom between the seal surface 13 and the seal washers 14. The spring 19, by reason of its compressive force toward the shoulder 20, maintains the seal washers 14 and spacers 16 in precise location. During operation of the impeller 10, a considerable pressure differential exists between the inlet and outlet thereof. The present seal, due to its ability to compensate for eccentric mounting of the seal surface 13, is capable of maintaining very close clearances with the seal surface 13, even though it may be of large diameter. Thus, the seal may be very efficient in proportion to its diameter. Such efficiency is highly desirable in a seal for usage, as in the present invention, in connection with high speed impellers and rotors of turbosuperchargers, compressors, turbines, and other similar machinery.

It will be understood that the present seal structure may be effectively applied to various rotating structures operating at high rotational speeds where the friction of a rubbing seal cannot be tolerated, and in which the rotating structure may be eccentric to the housing or support in which the seal is mounted.

I claim:

1. A seal for rotating structures comprising a housing, a tubular element disposed for rotation therein, said element having an inlet end and a peripheral seal surface, a plurality of axially spaced seal washers surrounding said seal surface and arranged in a close running fit relative thereto, spacers disposed between said washers and having liberal clearance relative to said seal surface, said housing having a bore in which said seal washers and spacers are retained, said seal washers having outer portions provided with liberal clearance relative to the wall of said bore, said spacers having outer portions disposed relatively closer to the wall of said bore, whereby said seal washers may be eccentric to said bore, a resilient means exerting pressure axially on said seal washers and spacers to maintain them intimately engaged with each other and stationary relative to said housing, shoulder means in said housing and forming an abutment for said seal washers and spacers in opposition to force exerted by said resilient means, a removable retainer supported by said housing and forming an abutment for said resilient means, and a guard ring between said resilient means and said removable retainer, said guard ring having a portion disposed to protect the inlet end of said tubular element.

2. A seal for rotating structures comprising a housing having an opening and a substantially concentric bore forming a shoulder, the wall of said bore having a recess formed therein in spaced relation to said shoulder; a tubular element disposed for rotation in the opening in said housing, said element having a peripheral seal surface; a plurality of alternately arranged seal washers and spacers disposed in said bore and surrounding said peripheral seal surface, said seal washers conforming closely to the diameter of the seal surface of said element and being spaced from the wall of said bore, said spacers conforming closely to the diameter of said bore and being spaced from the seal surface of said element; retainer means removably disposed in said recess; a guard ring in said bore adjacent said retainer means; and resilient means between said guard ring and said plurality of seal washers and spacers to retain the latter in intimate engagement with one another, said guard ring forming a flange projecting inwardly beyond said seal surface.

References Cited in the file of this patent

UNITED STATES PATENTS

| | | |
|---|---|---|
| 1,369,508 | Weiner et al. | Feb. 22, 1921 |
| 1,639,279 | Winkle | Aug. 16, 1927 |
| 2,130,075 | Dennison | Sept. 13, 1938 |
| 2,427,716 | Curtis | Sept. 23, 1947 |

FOREIGN PATENTS

| | | |
|---|---|---|
| 705,444 | Great Britain | Mar. 10, 1954 |